US008386511B2

(12) United States Patent
Schneider

(10) Patent No.: US 8,386,511 B2
(45) Date of Patent: Feb. 26, 2013

(54) MEASURING CONTEXTUAL SIMILARITY

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 437 days.

(21) Appl. No.: 12/395,341

(22) Filed: Feb. 27, 2009

(65) Prior Publication Data

US 2010/0223280 A1    Sep. 2, 2010

(51) Int. Cl.
  *G06F 7/00* (2006.01)
  *G06F 17/30* (2006.01)
(52) U.S. Cl. ................................................ 707/769
(58) Field of Classification Search .................. 707/688, 707/706, 713, 723, 727, 728, 730, 735–737, 707/748–750, 758, 999.001–999.01, 999.1, 707/999.101–999.107, 999.2–999.206
  See application file for complete search history.

(56) References Cited

U.S. PATENT DOCUMENTS

| 5,796,356 | A | 8/1998 | Okada et al. |
| 5,801,648 | A | 9/1998 | Satoh et al. |
| 5,844,508 | A | 12/1998 | Murashita et al. |
| 5,848,198 | A * | 12/1998 | Penn ............................ 382/276 |
| 5,907,637 | A | 5/1999 | Murashita et al. |
| 6,026,198 | A | 2/2000 | Okada |
| 6,061,398 | A | 5/2000 | Satoh et al. |
| 6,738,759 | B1 | 5/2004 | Wheeler et al. |
| 7,124,149 | B2 * | 10/2006 | Smith et al. ........................ 1/1 |
| 7,593,932 | B2 | 9/2009 | Lindh et al. |
| 7,831,559 | B1 | 11/2010 | Mohan et al. |
| 2002/0065857 | A1 | 5/2002 | Michalewicz et al. |
| 2002/0094080 | A1 | 7/2002 | Duan et al. |
| 2003/0012400 | A1 | 1/2003 | McAuliffe et al. |
| 2003/0033288 | A1 | 2/2003 | Shanahan et al. |
| 2003/0061200 | A1 | 3/2003 | Hubert et al. |
| 2003/0101164 | A1 | 5/2003 | Pic et al. |
| 2003/0200505 | A1 | 10/2003 | Evans |
| 2005/0086224 | A1 * | 4/2005 | Franciosa et al. ................. 707/6 |
| 2005/0108001 | A1 | 5/2005 | Aarskog |
| 2006/0015486 | A1 | 1/2006 | Nomiyama et al. |
| 2006/0235687 | A1 | 10/2006 | Carus et al. |
| 2007/0206884 | A1 | 9/2007 | Kato |
| 2007/0233477 | A1 | 10/2007 | Halowani et al. |
| 2008/0005651 | A1 | 1/2008 | Grefenstette et al. |
| 2008/0082531 | A1 | 4/2008 | Suarez |
| 2008/0114750 | A1 * | 5/2008 | Saxena et al. ...................... 707/5 |
| 2008/0162455 | A1 | 7/2008 | Daga et al. |
| 2008/0162456 | A1 | 7/2008 | Daga et al. |
| 2008/0270119 | A1 | 10/2008 | Suzuki |
| 2009/0030671 | A1 | 1/2009 | Kwon et al. |
| 2009/0125805 | A1 | 5/2009 | Ananthanarayanan et al. |
| 2010/0131569 | A1 | 5/2010 | Jamison et al. |

OTHER PUBLICATIONS

Hua-Jun Zeng, Qi-Cai He, Zheng Chen, Wei-Ying Ma, Jinwen Ma, "Learning to Cluster Web Search Results", ACM, Jul. 25-29, 2004, 8 pgs.
Red Hat Final Office Action for U.S. Appl. No. 12/395,319 mailed Aug. 15, 2011.
Red Hat Office Action for U.S. Appl. No. 12/395,319 mailed Mar. 24, 2011.

(Continued)

*Primary Examiner* — Khanh Pham
*Assistant Examiner* — Reza Hosseini
(74) *Attorney, Agent, or Firm* — Lowenstein Sandler LLP

(57) ABSTRACT

A contextual similarity measurement system computes a similarity model for a reference document using a prediction by partial match method. The system further computes a similarity measure between a compared document and the reference document using the similarity for the reference document.

18 Claims, 8 Drawing Sheets

OTHER PUBLICATIONS

Red Hat Office Action for U.S. Appl. No. 12/395,507 mailed Jul. 15, 2011.
Red Hat Inc., Final Office Action for U.S. Appl. No. 12/395,507 mailed Dec. 1, 2011.
Red Hat Inc., Advisory Action for U.S. Appl. No. 12/395,507 mailed Feb. 2, 2012.
Red Hat Inc., Advisory Action for U.S. Appl. No. 12/395,319 mailed Oct. 27, 2011.
USPTO, Office Action for U.S. Appl. No. 12/395,319 mailed Jun. 4, 2012.
USPTO, Office Action for U.S. Appl. No. 12/395,507 mailed Jun. 12, 2012.

* cited by examiner

MEASURING CONTEXTUAL SIMILARITY

RELATED APPLICATIONS

This application is related to co-pending U.S. patent application Ser. No. 12/395,319 filed Feb. 27, 2009, entitled "Preprocessing Text to Enhance Statistical Features," and co-pending U.S. patent application Ser. No. 12/395,507, filed Feb. 27, 2009, entitled "Discriminating Search Results by Phrase Analysis", which are assigned to a common assignee of the present application.

TECHNICAL FIELD

Embodiments of the present invention relate to a method and system for relating documents. Specifically, embodiments of the invention relate to measuring contextual similarity between documents.

BACKGROUND

Similarity documents comparison measures the similarity of documents based on the content of each document. These measures have uses in different areas that utilize the similarity or dissimilarity of two or more documents. For example, clustering techniques groups different documents according to the similarity of the documents.

However, some similarity measures return a vector instead of a single value metric. A vector similarity measure is more difficult to use than a single-valued metric to determine whether documents are more or less similar For example, consider a vector similarity measure with two components, and three documents A, B, and C. In this example, the vector similarity measure between documents A and B is (0, 1), and the vector similarity measure between documents B and C is (1, 0), This measure does not provides information to determine whether document B is more similar to A or more similar to C.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

The contextual similarity system computes a similarity model for a reference document and uses this model to compute a similarity measure between a compared document and the reference document. In particular, in one embodiment, the contextual similarity system computes a similarity model for a reference document using a prediction by partial match model that attempts to match a token and a set of tokens subsequent to that token. The contextual similarity system stores this model, which is used to measure the similarity distance between the reference and other compared documents.

To measure the similarity distance between the reference and other compared documents, contextual similarity measurement system computes a similarity score for the reference document and the compared documents. This system computes the similarity scores for the different documents by computing the number of compression bits are needed to compress the tokens in each of the documents using the reference similarity model. The system computes the similarity measure using the similarity scores.

Figure 1:
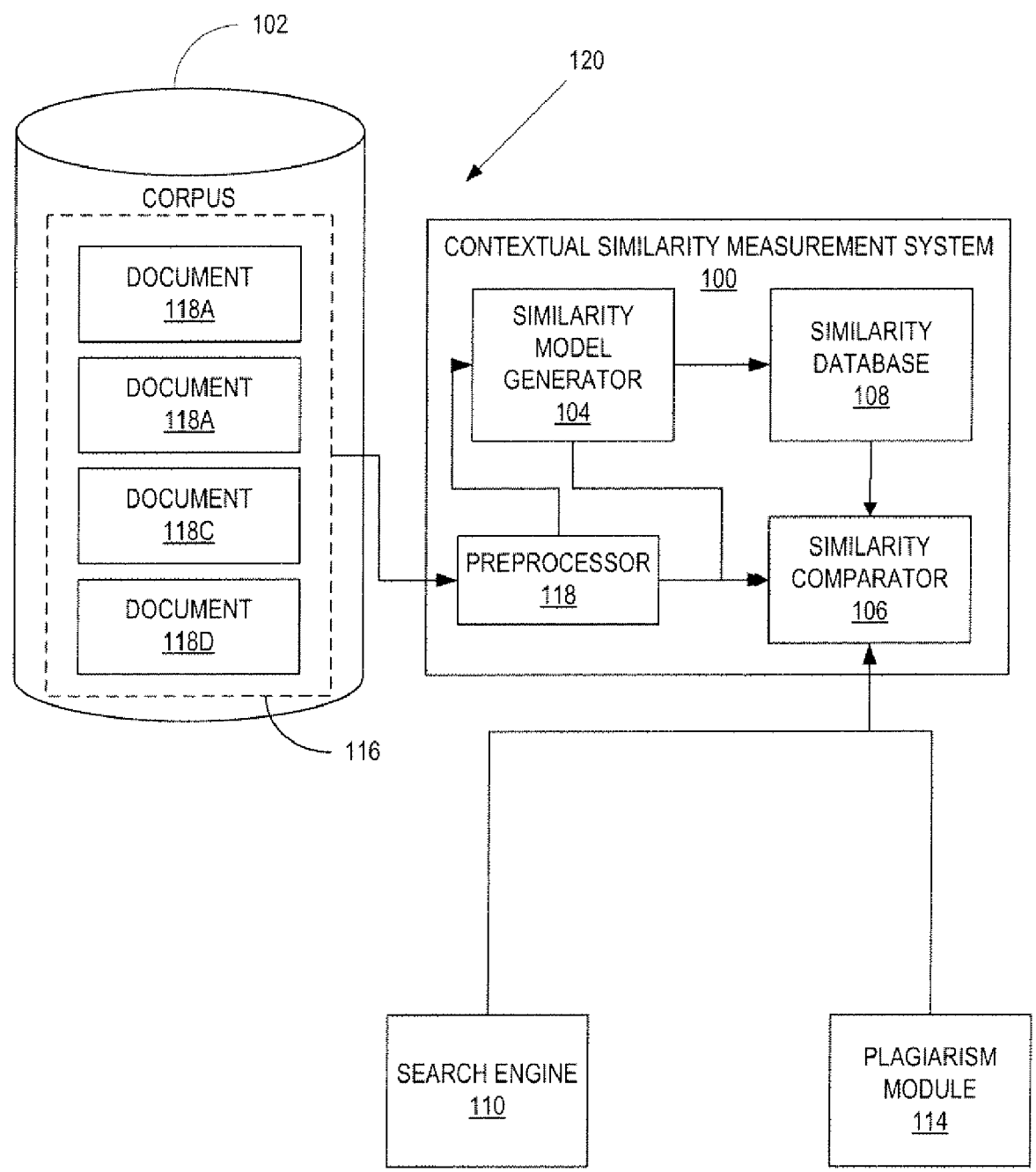
FIG. 1 is a block diagram of one embodiment of contextual similarity measurement system.

FIG. 1 is a block diagram of one embodiment of contextual similarity measurement system. In FIG. 1, system 120 comprises document database 102 and contextual similarity measurement system 100. Document database 102 comprises a corpus of documents 116. The corpus 116 is the set of documents available to contextual similarly measurement system 100 and comprises documents 118A-D. While in one embodiment, corpus 116 is stored in one database, in alternate embodiments, corpus 116 is stored across multiple databases on one or more different machines. In a further embodiment, corpus 116 includes documents that are available for online retrieval (e.g., web pages, etc.) from one or more sources.

Contextual similarly measurement system 100 measures the contextual similarity between documents stored in document database 102. As mentioned above, contextual similarity determines how close in context two documents are to each other. Two documents are more contextually similar if the documents have the same words in the same places. For example and in one embodiment, the phrases "the quick brown fox jumps over the lazy dog" and "the quick brown fox jumped over the lazy dog" are contextually similar because these two phrases have most of the same words in mostly the same places. However, the phrases "the quick brown fox jumps over the lazy dog" and "the speedy black fox leaped over the slothful shepherd" is not as contextually similar because the latter set of phrases has different words.

Contextual similarity measurement system 100 comprises similarity model generator 104, similarity database 108, similarity comparator 106, and preprocessor 118. Preprocessor preprocesses the documents for similarity model generator 104 and similarity comparator 106. Preprocessing is further described below with reference to FIG. 2. Similarity model generator 104 generates a similarity model for each of the documents stored in document database 102. In one embodiment, similarity model generator 104 generates a prediction by partial match model for each of the documents in the document database 102. In this embodiment, similarity model generator 104 generates different contexts for each of the tokens within the document. In one embodiment, a token is a sequence of characters considered a single unit. While in one embodiment, a token is a word, in alternate embodiment, a token is an operator symbol(s), number, abbreviation, etc., and/or combinations thereof. In a further embodiment, a token is consecutive overlapping or non-overlapping pairs, triplets, etc. of words. For example, and in one embodiment, the phrase "The quick brown fox jumps over the lazy dog" could yield the tokens "the quick," "quick brown," "brown fox," "fox jumps," "jumps over," "over the," "the lazy," and "lazy dog" with overlapping pairs. As another example, and in another embodiment, non-overlapping triplets yield "the quick brown," "fox jumps over." and "the lazy dog."

Similarity comparator 106 compares the documents using one of the similarity models generated by similarity model generator 104. In one embodiment, similarity comparator 106 computes a similarity measurement (or equivalently, a metric) that compares the similarity between a compared document and a reference document. In one embodiment, similarity comparator 106 uses a similarity model for the reference document. In one embodiment, similarity comparator 106 computes a similarity score for a compared and reference documents using the similarity model of the reference document. Using these two similarity scores, similarity comparator 106 computes the similarity measure between the compared and reference documents. The reference document as used herein refers to the document that corresponds to the similarity model used in the computation. The compared document as used herein refers to the document that is being compared to the reference document. The compared document can be the reference document or a document different from the reference document.

In one embodiment, the metric computed by similarity comparator is a single valued metric. In this embodiment, the larger the similarity metric value, the more dissimilar the two compared documents are. Conversely, a smaller similarity metric value means that the two documents are more similar.

Contextual similarity measurement system 100 stores the similarity metrics in similarity database 108. These stored similarity metrics are used by different applications to measure how similar or dissimilar various documents are. In one embodiment, a Web search engine 110 uses these metrics to group Web search results. In this embodiment, Web search engine 110 retrieves similarity metrics for each pair of documents in the search results. Based on the retrieved metrics, Web search engine 110 groups these results.

Figure 2:
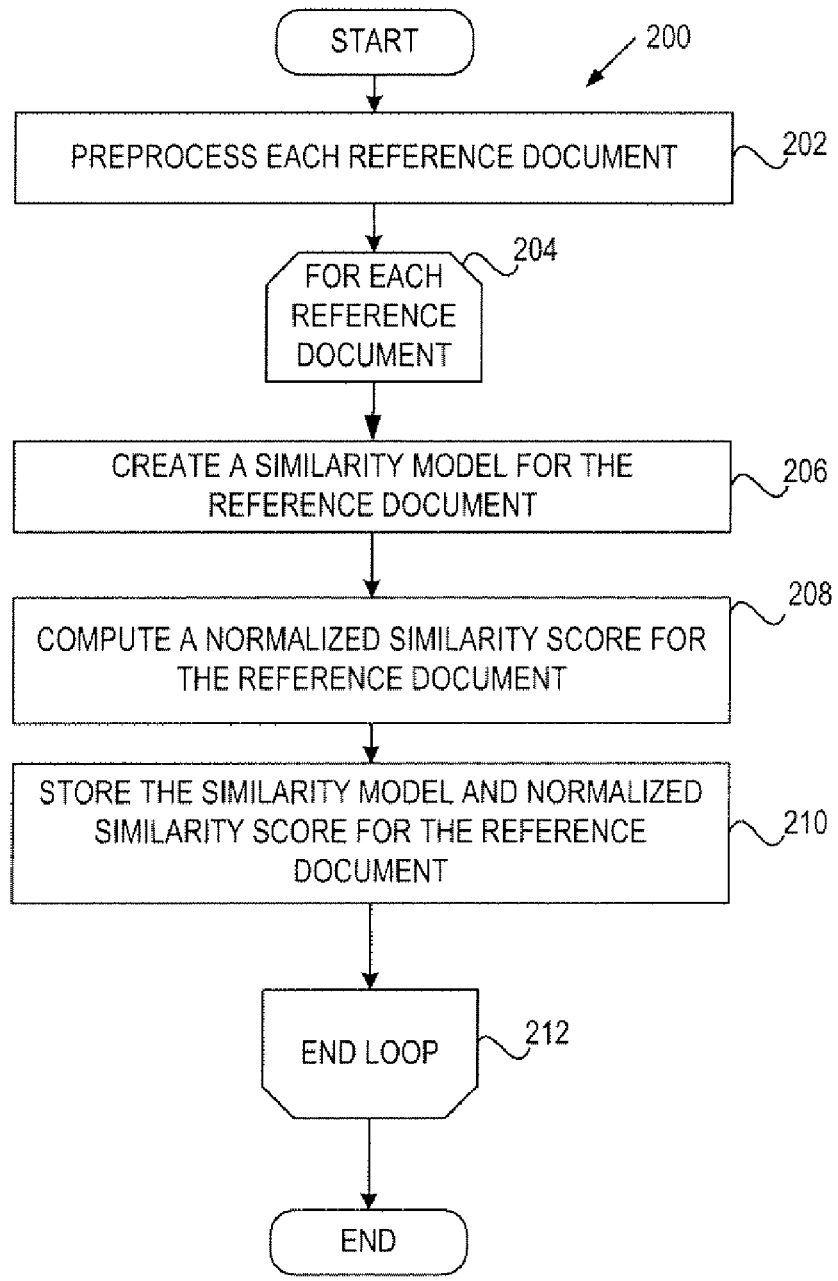
FIG. 2 is a flowchart diagram of one embodiment of a process for computing a similarity model for a reference document.

FIG. 2 is a flowchart diagram of one embodiment of a process 200 for computing a contextual similarity model for a reference document. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 200 is performed by a similarity model generator used in a contextual similarity measurement system, such as similarity model generator 104 of FIG. 1.

Referring to FIG. 2, process 200 begins with processing logic preprocessing each reference document at block 202. In one embodiment, process 200 preprocesses a reference document by removing all punctuation and lower casing each character in the reference document. In an alternative embodiment, process 200 replaces words, characters, and/or symbols with equivalent words, characters, and/or symbols. For example and in one embodiment, process 200 replaces the words "propel" with "row" and "water craft" with "boat." In this example, the phrase "propel, propel, propel, your water craft" is transformed into "row, row, row, your boat." In a further embodiment, process 200 preprocesses the reference document to enhance the statistical features of the reference document. This is described in further detail in a co-pending patent U.S. patent application Ser. No. 12/395,319 , filed Feb. 27, 2009, entitled "Preprocessing Text to Enhance Statistical Features," and assigned to a common assignee of the present application.

In one embodiment, preprocessing is used to reduce artifacts that can arise in contextual similarity systems. For example, and in one embodiment, a straight contextual system can categorize phrases that are semantically similar (e.g., having the same meaning) and being contextually dissimilar. In this example, the phrases "the green bail" and "the ball is green" are semantically similar, but contextual different. Preprocessing can be used to reduce these contextual artifacts.

At block 204, process 200 executes a processing loop (blocks 204-212) to compute a similarity model and similarity score for each reference document. At block 206, process 200 computes a similarity model for the reference document based on adaptive entropy coding compressor. In one embodiment, the adaptive entropy coding compressor uses a prediction by partial match (PPM) model to make predictions. In one embodiment, the more accurate the predictions, the fewer bits are needed to code a token. An example of an adaptive entropy coding compressor is described in detail in the patent "Compression Ratio of Adaptive Compression Algorithms", U.S. Pat. No. 7,564,383, filed Nov. 30, 2007. In this embodiment, process 200 computes the similarity model by creating multiple contexts for compressing the documents. However, instead of the creating the multiple contexts based on characters as in the above patent, process 200 creates the multiple contexts based on the tokens in the reference document. This is described further below with reference to FIG. 3.

At block 208, process 200 computes a normalized similarity score for the reference document. In one embodiment, process 200 computes a raw similarity score by computing the number of compression bits needed to compress the reference document using the similarity model for this reference document. Furthermore, process 200 normalizes the raw similarity score by dividing the raw similarity score by the number of tokens in the reference document. Computing the raw similarity score is further described with reference to FIG. 5 below.

Process 200 stores the similarity model and normalized similarity score for the reference score at block 210. In one embodiment, process 200 stores this model and score in similarity database 108 as describe with reference to FIG. 1 above. The processing loop ends at block 212.

Figure 3:
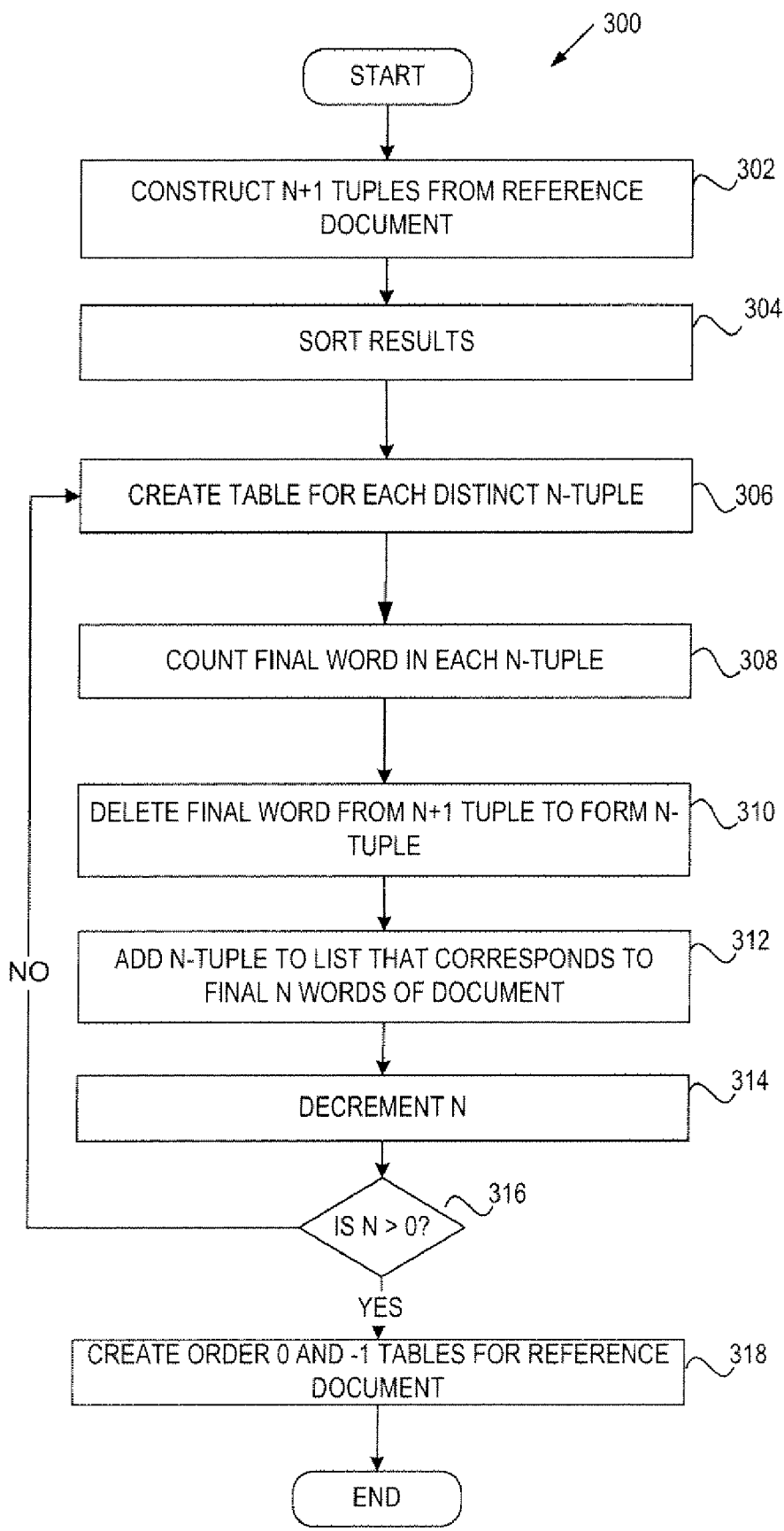
FIG. 3 is a flowchart of one embodiment of a process for computing a prediction by partial match table for the similarity model.

FIG. 3 is a flowchart of one embodiment of a process 300 for computing a prediction by partial match table that is part of the similarity model for a reference document. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 300 is performed by a similarity model generator used in a contextual similarity measurement system, such as similarity model generator 104 of FIG. 1.

Referring to FIG. 3, process 300 begins by constructing N+1 tuples of consecutive tokens from a reference document at block 302. In one embodiment, the N+1 tuples are pieces of the documents. For example, and in one embodiment, if the document included the phrase "the quick brown fox jumps over the lazy dog", the third order tuples are "the quick brown", "quick brown fox", brown fox jumps, "fox jumps over," "jumps over the," "over the lazy," and "the lazy dog." At block 304, process 300 sorts these tuples. In one embodiment, process 300 sorts these tuples alphabetically.

At block 306, process 300 creates a table for each distinct N tuple. In one embodiment, process 300 selects the first N words from each tuple, creates a table for each N tuple and, ignoring the duplicate tuples. For example, and in one embodiment, process 300 creates tables for the second order tuples "the quick," "quick brown," brown fox," "fox jumps," "jumps over," "over the," and "the lazy."

At block 308, process counts the final word in each N tuple. For example and in one embodiment, process 300 counts the words "brown," "fox," "jumps," "over," "the," "lazy," and "dog." In this example, process 300 counts each token once. In alternate embodiment, if there were N+1 tuples: "the brown cat," the brown dog," and "the brown cat," there is one table for the N tuple "the brown" with a count of two for the token "cat" and one for the token "dog." Process 300 deletes the last word from each N+1 tuple to from the N tuples at block 310.

At block 312, process 300 adds the N tuples to a list that corresponds to the last N tokens of the document.

Process 300 decrements N by one at block 314 and determines if N is greater than zero at block 316. If N is greater than zero, process 300 repeats blocks 306 through 314 to construct tables for N tuples, with N greater than zero. In one embodiment, process 300 constructs the lower order tables from higher order tables. For example, and in one embodiment, process 300 creates the order 1 tables for "the," "quick," "brown," "fox," "jumps," "over," "lazy," and "dog" from the order 2 tables described above. In this embodiment, each table includes the token that follows table token in the document. For example, the token "the" has the entries "quick" and "lazy."

If N is equal to zero, process 300 creates the order zero and minus one (−1) tables for the reference document similarity model at block 318. In one embodiment, the order zero table is the list of distinct tokens in the reference document. For example, and in one embodiment, the document with the phrase "the quick brown fox jumps over the lazy dog" has a table with the list of tokens "the," "quick," "brown," "fox," "jumps," "over," "lazy," and "dog."

In one embodiment, the order −1 table comprises the list of tokens that can possibly be used in any reference document. For example, and in one embodiment. the order −1 table comprises the words in a dictionary.

Figure 4:
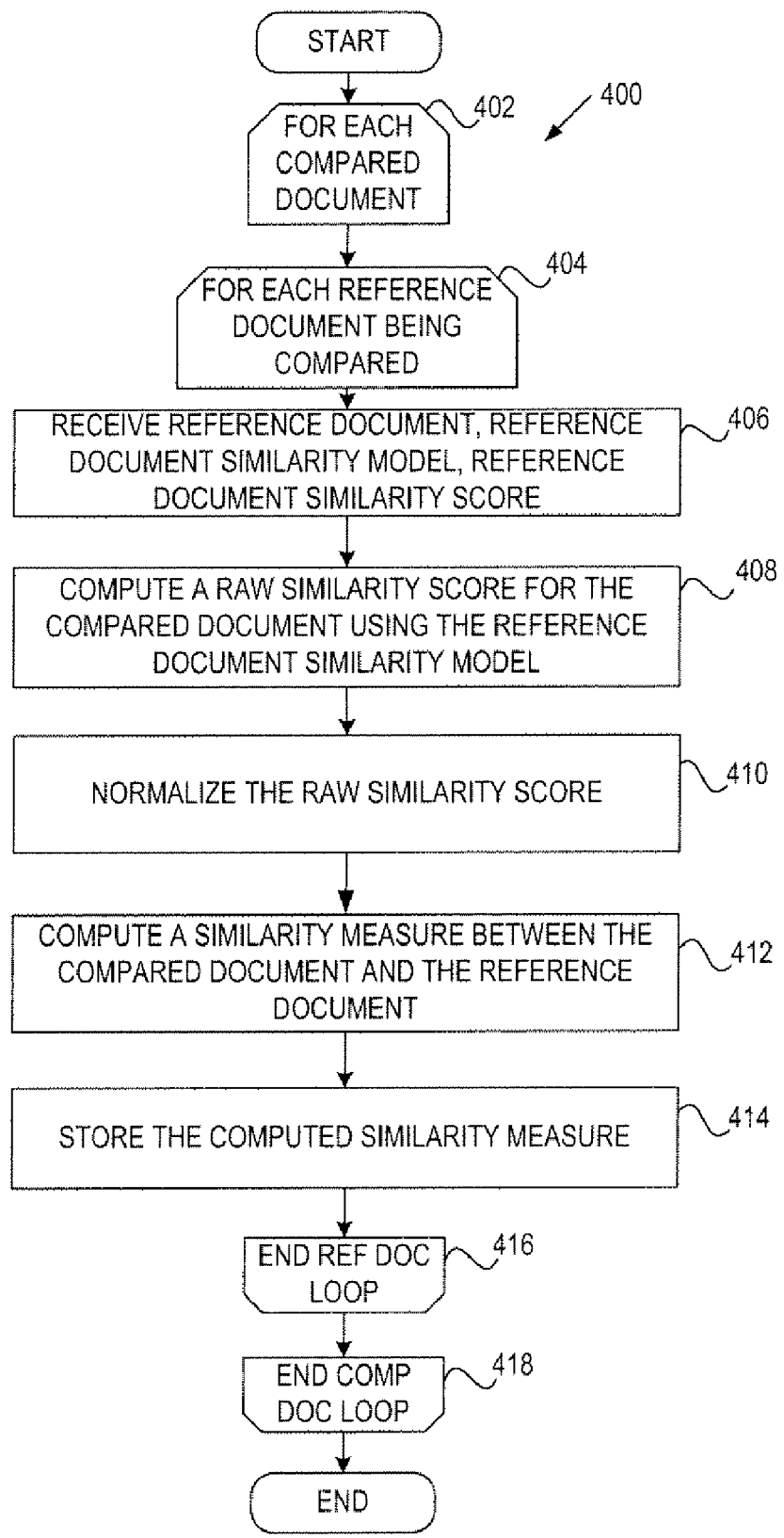
FIG. 4 is a flowchart of one embodiment of a process for computing a similarity measure between a compared document and a reference document using the reference document similarity model.

With the reference similarity model computed, a similarity score can be computed for the reference document. This similarity score gives a baseline that can be used to measure a similarity difference with other documents. FIG. 4 is a flowchart of one embodiment of a process 400 for computing a similarity measure between a compared document and a reference document using the reference document contextual similarity model. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 400 is performed by a similarity comparator used in a contextual similarity measurement system, such as similarity comparator 106 of FIG. 1.

Referring to FIG. 4, process 400 begins by executing an outer processing loop to compute a similarity measure for each compared document with each reference document (blocks 402-418). Process 400 executes an inner processing loop to compute a similarity measure (blocks 404-416). At block 406, process 400 receives the referenced document, reference document similarity model, and reference document similarity score. In one embodiment, the reference document similarity model and score are calculated using a process as described in FIG. 3 above. In one embodiment, process 400 receives these items from contextual similarity system 102 as described in FIG. 1 above.

At block 408, process 400 computes a raw similarity score for the compared document using the reference document similarity model. In one embodiment, process 400 computes the raw similarity score using the reference documents similarity model as described in FIG. 5 below. For example and in one embodiment, a process 400 computes a raw similarity score for the phrase P1 that is "the quick brown fox jumps over the lazy dog" using the similarity model for the phrase P1. In this embodiment, process 400 computes a raw similarity score of 10.9 (for the computation of this score, see FIG. 5 below). For example and in one embodiment, a process 400 computes a raw similarity score for the phrase P2 that is "the quick brown fox jumped over the lazy dog" using the similarity model for the phrase P1. In this embodiment, process 400 computes a similarity score of 35.5 (for the computation of this score, see FIG. 5 below). Computing the raw similarity score of a compared document using the reference document is used to measure how similar the compared and reference documents are.

Process 400 normalizes the raw similarity score at block 410. In one embodiment, process 400 divides the raw similarity score by the number of tokens in the referenced document. The number of tokens in this phrase is nine, which results in a normalized similarity score for phrases P1 and P2 of 1.2 and 4.0, respectively.

At block 412 process 400 computes a similarity measure between the compared document and the referenced document. In one embodiment, process 400 computes the similarity measure using Eq. (1):

$$\text{similarity measure} = \frac{\text{norm. sim. score(compared document)}}{\text{norm. sim. score(reference document)}} \quad (1)$$

Using Eq. (1), the similarity measure results from the division of normalized similarity score of the compared document. Using the example from above, a similarity measure for the phrases P2 and P1, with the latter phrase as the reference, is 4.0/1.2=3.3.

In one embodiment, the similarity measure of Eq. (1) can be used as a mathematical metric by subtracting one from the similarity measure. In this embodiment, a metric value of zero can result when two identical documents are compared.

Process 400 stores the computed similarity measure at block 414. In one embodiment, process 400 stores the computer similarity measure in similarity database 108 as described FIG. 1 above. The processing loop for computing a similarity score for a compared document with each reference document ends at block 416. The processing loop for computing a similarity measure for each compared document ends at 418.

Figure 5:
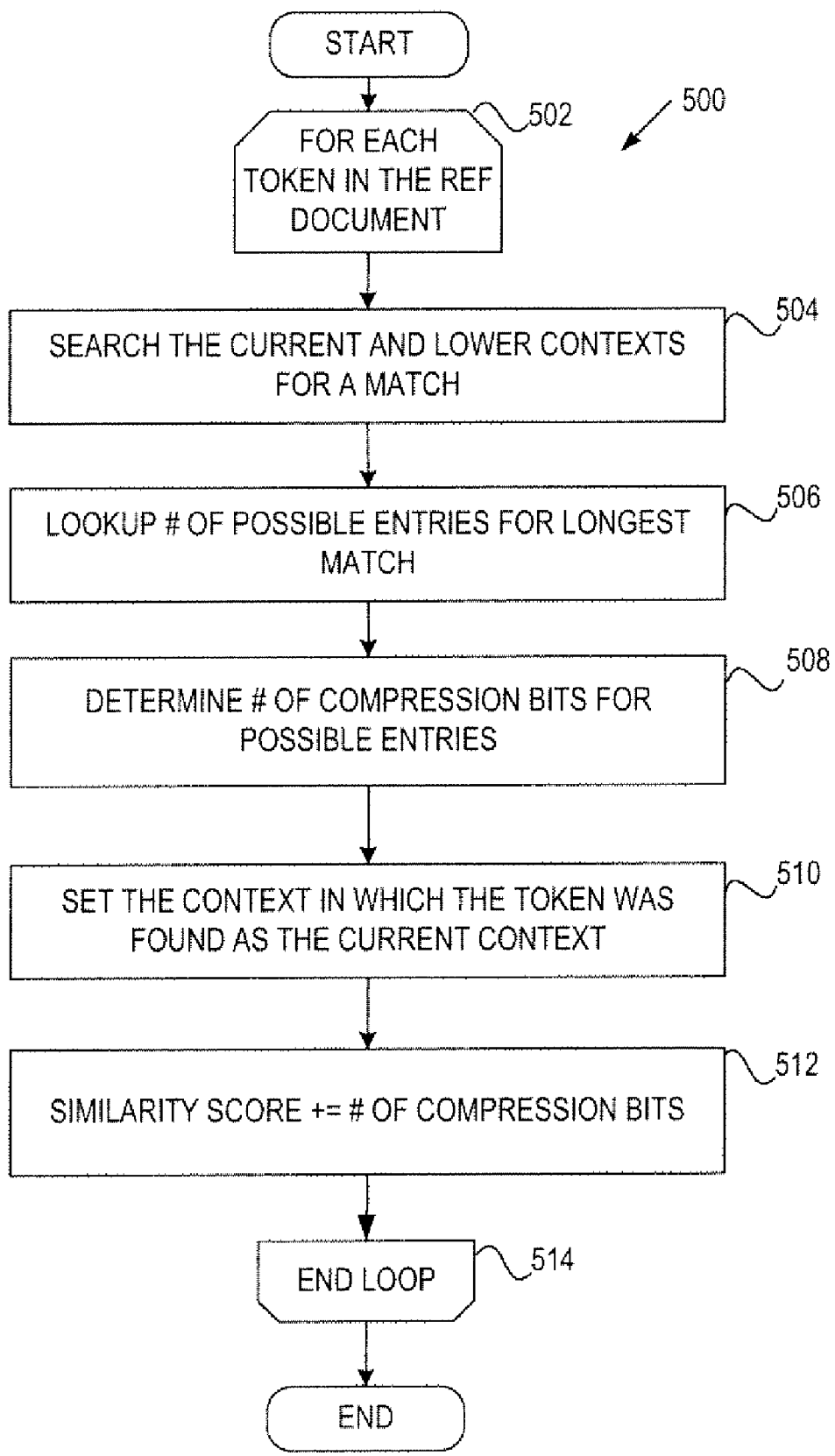
FIG. 5 is a flowchart one embodiment of a process of computing a contextual similarity score of the reference document.

FIG. 5 is a flowchart one embodiment of a process 500 of computing a similarity score of a document. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 500 is performed by a similarity comparator used in a contextual similarity measurement system, such as similarity comparator 106 of FIG. 1.

Referring to FIG. 5, process 500 begins by executing a processing loop for each token in the document to calculate the document similarity score using a reference document similarity model (blocks 502-514). In one embodiment, process 500 calculates a reference similarity score for the same reference document that was used to compute the reference similarity model. In this embodiment, process 500 uses order 0 and higher contexts. If process 500 escapes to the order −1 contexts, then an error occurs. This is described further below. In another embodiment, process 500 calculates a compared document similarity score using the reference document similarity model. Furthermore, in this embodiment, process 500 uses order −1 and higher contexts. This is because the compared documents include may tokens that are not found in the reference document.

At block 504, process 500 searches the current and lower contexts for the token, including the order −1 context, which includes all the known tokens in the corpus of documents. In one embodiment, at each token, process 500 starts in the highest context that exists. In this embodiment, if a token is not in the reference model, that would be the order 0 context. If process 500 successfully encodes the token in the order 0 context (e.g., finding the token in that context), process 500 (sets the current context to the next higher context. In this embodiment, process 500 would use the order 1 context for the next token. Other contexts are handled in the same fashion at block 510 below. In one embodiment, process 500 determines the longest match for the token and subsequent tokens in the reference similarity model. In one embodiment, process 500 searches an order N context by searching the corresponding order N table. For example, and in one embodiment, process 500 searches an order 2 context by searching the order 2 tables for a token match.

For example, and in one embodiment, process 500 determines the context for the first occurrence of word "the" in the phrase P1 using the P1 similarity model. In the first occurrence, the contexts that are available to process 500 are the order 0 context and an escape to the order −1 context. Because the word "the" exists in the order 0 context for this phrase, the order 0 context is used.

Process 500 searches for matches by building up the higher order contexts as process 500 determines matches. As another example, moving on the next word in the phrase, process 500 looks for the token "quick" in the context of "the quick" tuple. As match is found in the order 1 table (context) "the" and two entries "quick" and "lazy." As a further example, for the next word in the phrase, process 500 looks for the token "brown" in the context "the quick brown." A match is found under the table "the quick" and has one entry "brown."

Using these contexts process 500 determines if there is a match found in the current context. If no match is found in process 500 continually escapes to the next lower order until a match is found. In one embodiment, process 500 is computing a score for the reference document. In this embodiment, the lowest order in which there is a match for the reference document is the order 0 context. This is because the tokens for the reference document exist in the order 0 context. If process 500 escapes to the order −1 context for a reference document, an error occurs (not shown). In another embodiment, the lowest order in which there is a match for the compared document is the order −1 context, which contains all the tokens in the corpus of documents.

At block 506, process 500 looks up the number of possible entries for the matching context at block 506. Process 500 uses this number of possible entries to compute the number of compression bits for the possible entries at block 508. In one embodiment, process 500 computes the number of compression bits needed to find one of the tokens in the table by taking the $\log_2$ of the total number of entries in that table divided by the count for the token of interest in that table. For example, for an order −1 table that uses the number of words in an English language dictionary, approximately 260,000, the number of compression bits is $\log_2(260,000)$=18.0. As another example, in the order 0 table above ("the," "quick," "brown," "fox," "jumps," "over," "lazy," and "dog.") has nine entries plus one extra entry for an escape to the order −1 context. In this example, the number of compression bits is $base_2$ of (number of entries in the table divided by the count for the particular token. Thus, for the token "the" is $\log_2(10/2)$=2.3. In another example, the number of compression bits for "fox" in the order 0 table is $\log_2(10)$=3.3. For higher order tables with smaller number of entries, the number of compression bits is smaller. For example, and in one embodiment, table two entries results in the number compression bits used as one.

For example, and in one embodiment, process 500 computes a raw similarity score for the P1 phrase of 10.9, using the P1 similarity model. This results from the number of compression bits needed for each token as 2.3 for "the", 1.6 for "quick" (e.g., using the context for "the", which has a table count of three, token count of one, and requiring 1.6 bits), one for the rest of the token (e.g., each of the rest of the tokens use a context that has a table with two entries and one count for the token). This sums to a value of 10.9.

As another example and in another embodiment, process 500 computes a raw similarity score for the P2 phrase of 35.5, using the P1 similarity model. In this embodiment, the compression bits for the tokens "the," "quick," "brown," and "fox" are the same for the P1 computation (2.3, 1.6, 1, and 1). For the token "jumped", which is not in the "brown fox" context or the "fox" context, an escape is needed for each. This costs one bit each. In the order 0 context, process 500 cannot code "jumped", so 3.3 bits is needed to escape to the order −1 context. For the order −1 context, 18 bits is used to code "jumped" for the order −1 context. The total number of bits for "jumped" is 1+1+3.3+18=23.3. For the next token "over", process 500 computes 3.3 bits using the order 0 context. The order 0 context is used since "jumped" was coded using the order −1 context. For the remaining tokens "the", "lazy," and "dog," process 500 uses one bit for each. The total number for P2 is 35.5 bits.

At block 510, process 500 sets the current context as the next higher context from the context where the token was found. The current context is used above at block 506 as a starting point to search for the next token in the document.

At block 512, process 500 increments of the similarity score by the number of compression bits determined at block 508. Processing loop ends at block 514.

Figure 6:
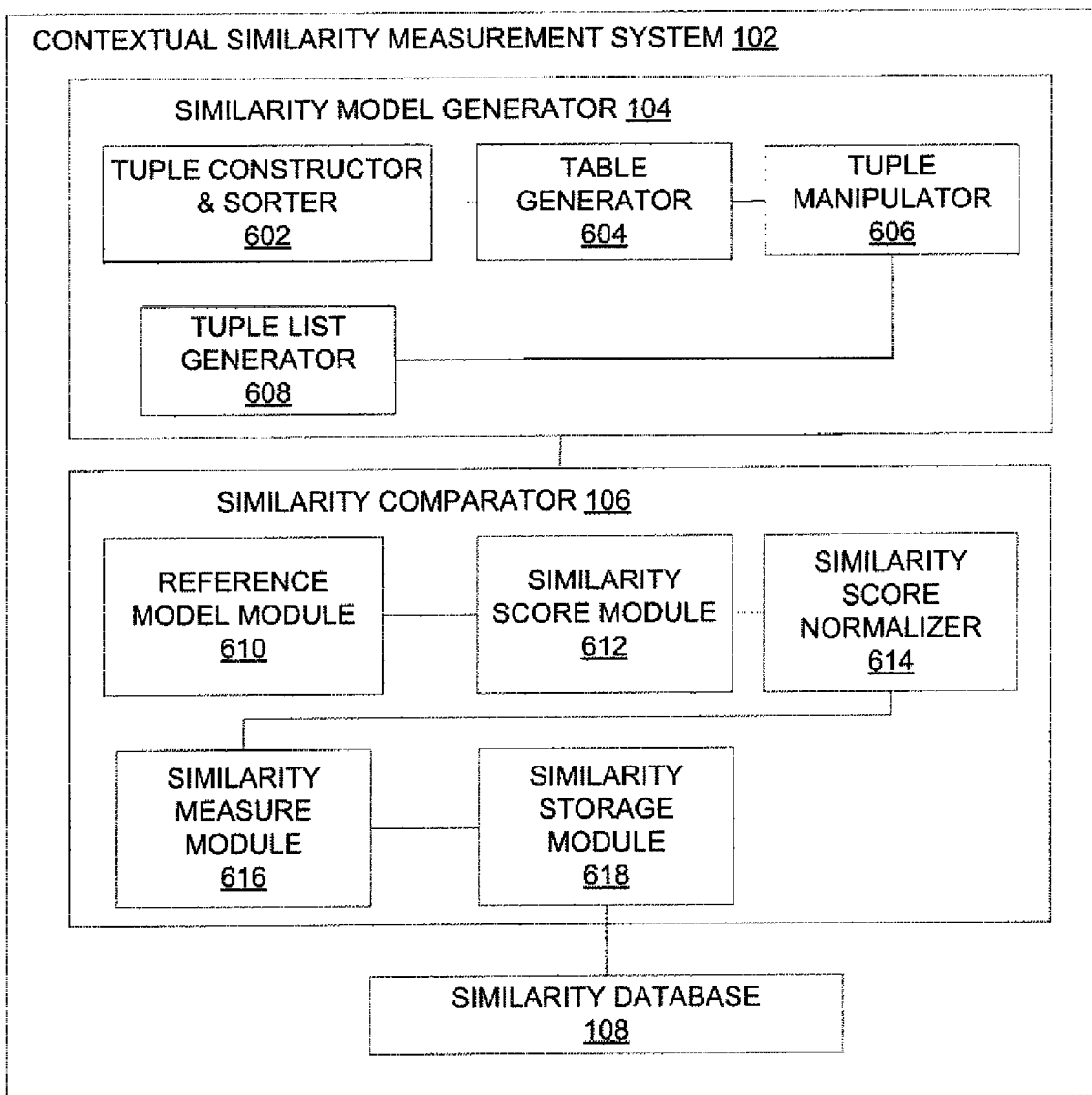
FIG. 6 is a block diagram of a contextual similarity measurement system that computes the contextual similarity model for the reference document.

FIG. 6 is a block diagram of a contextual similarity measurement system 102 that computes the similarity model and similarity measures. As described in FIG. 1, contextual similarity measurement system 102 comprises similarity model generator 104, similarity comparator 106, and similarity database 108. Similarity model generator 104 comprises tuple constructor and sorter 602, table generator 604, tuple manipulator 606, and tuple list generator 606. Tuple constructor and sorter 602 constructs the N+1 tuples from the reference document and sorts theses tuples as described in FIG. 3, blocks 302 and 304. Table generator 604 creates a table for each distinct N tuple as described in FIG. 3, block 306. Tuple manipulator 606 counts and deletes the final word from each N tuple as described in FIG. 3, blocks 308 and 310. Tuple list generator 606 adds the N tuple to the list that corresponds to the final N words of the reference document as described in FIG. 3, block 312.

Similarity comparator 106 comprises reference model module 610, similarity score module 612, similarity score normalizer 614, similarity measure module 616, and similarity storage module 618. Reference model module 610 receives the reference document, reference document similarity model, and reference document similarity score as described in FIG. 4, block 406. Similarity score module 612 computes the raw similarity score for the reference and/or compared document as described in FIG. 2, block 206 and FIG. 4, block 408. Similarity score normalizer 614 normalizes the raw similarity score as described in FIG. 2, block 208 and FIG. 4, block 410. Similarity measure module 616 computes a similarity measure between the compared document and the reference document as described in FIG. 4, block 412. Similarity storage module 618 stores the computed similarity measure as described in FIG. 4, block 414.

Figure 7:
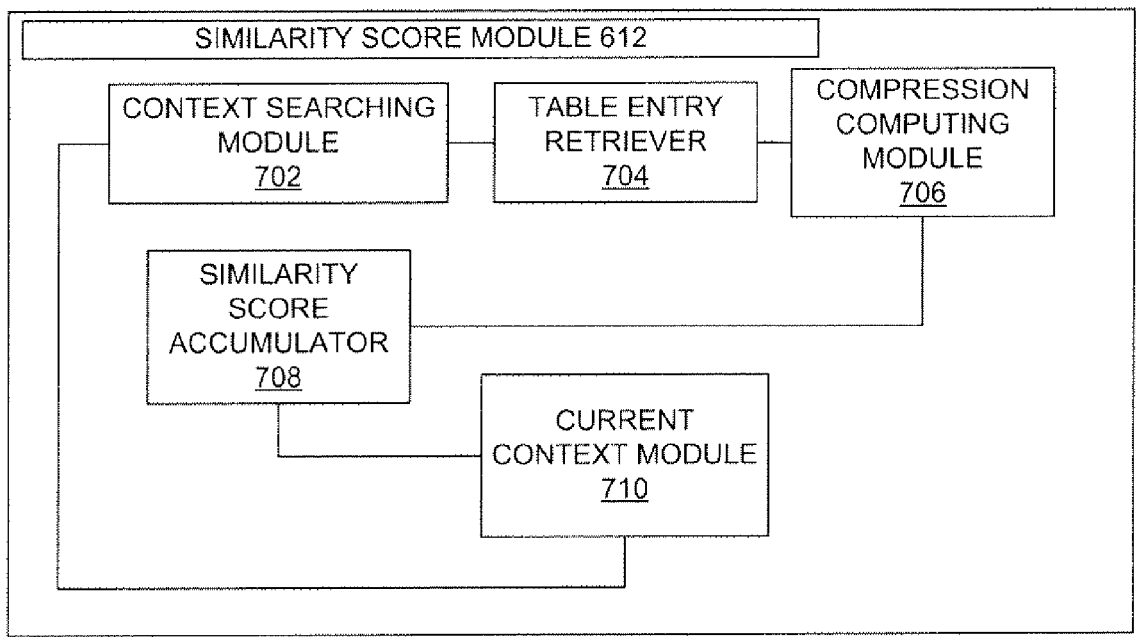
FIG. 7 is a block diagram of a similarity score module that computes the contextual similarity scores for the reference and/or compared documents.

FIG. 7 is a block diagram of a similarity score module 612 that computes the raw similarity scores for the reference and/or compared documents. Similarity score module comprises context search module 702, table entry retriever 704, compression computing module 706, similarity score accumulator 708, and current context module 710. Context search module 702 searches for the context that matches the current token as described in FIG. 5, block 504. Table entry retriever 704 determines the number of entries associated with the current token as described in FIG. 5, block 506. Compression computing module 706 computes the number of compression bits to use for a token as described in FIG. 5, block 508. Similarity score accumulator 708 accumulates the similarity score for the compared and/or reference documents as described in FIG. 5, block 512. Current context module 710 sets the current context as described in FIG. 5, block 510.

Figure 8:
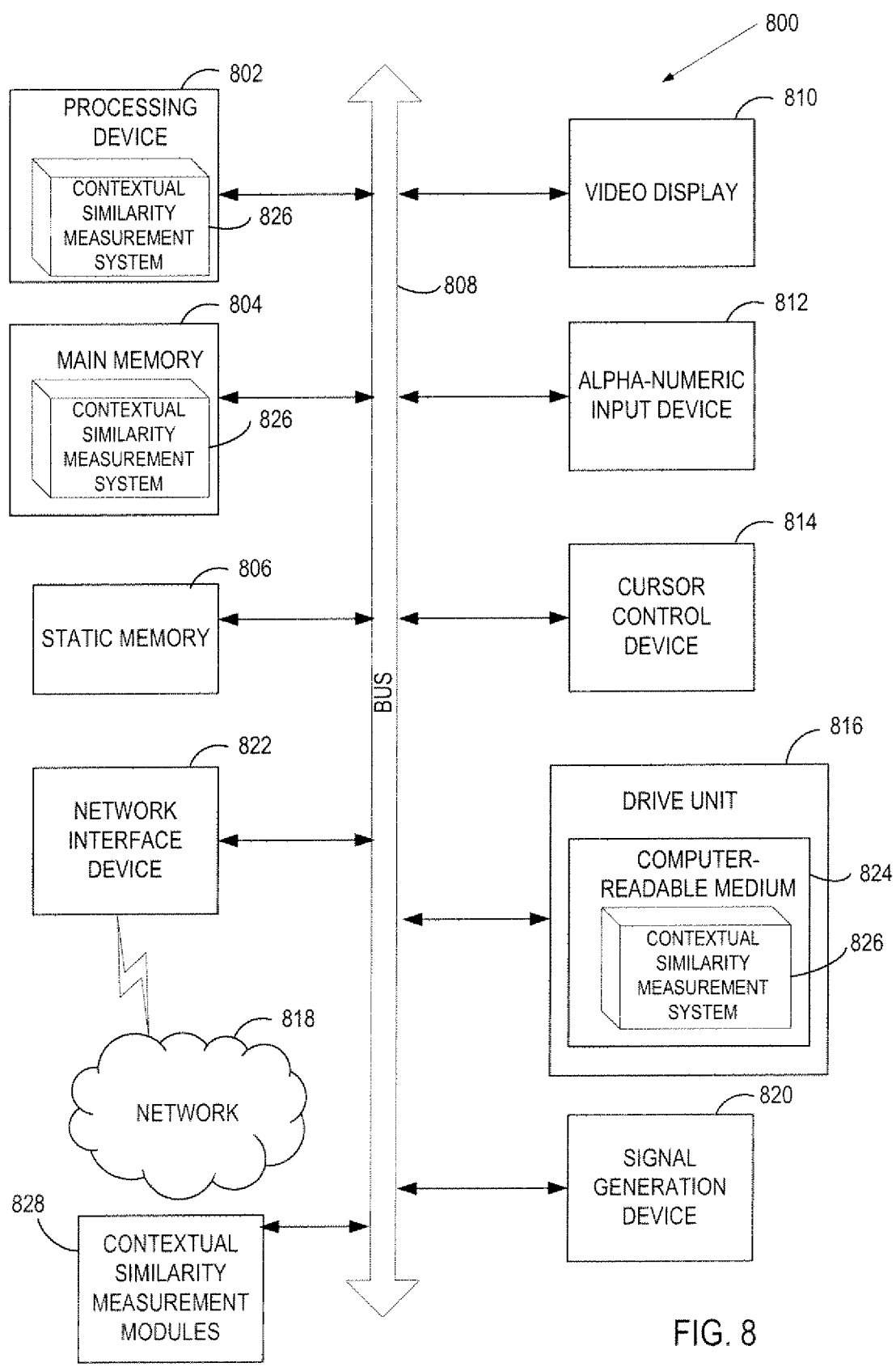
FIG. 8 is a diagram of one embodiment of a computer system for computing a contextual similarity measure.

FIG. 8 is a diagram of one embodiment of a computer system 800 for computing a contextual similarity measure. Within the computer system 800 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer accessing documents from a document database and the server computer computing contextual similarity measurements and transmitting the measurements) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or an machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory 816 (e.g., a data storage device in the form of a drive unit, which may include fixed or removable computer-readable storage medium), which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the contextual similarity measurement system 826 for performing the operations and steps discussed herein.

The computer system 800 may further include a network interface device 822. The computer system 800 also may include a video display unit 810 (e.g., a liquid crystal display (LCD) or a cathode ray tube (CRT)) connected to the computer system through a graphics port and graphics chipset, an alphanumeric input device 812 (e.g., a keyboard), a cursor control device 814 (e.g., a mouse), and a signal generation device 820 (e.g., a speaker).

The secondary memory 816 may include a machine-readable storage medium (or more specifically a computer-readable storage medium) 824 on which is stored one or more sets of instructions (e.g., the contextual similarity measurement system 826) embodying any one or more of the methodologies or functions described herein. The contextual similarity measurement system 826 may also reside completely or at least partially, within the main memory 804 and/or within the processing device 802 during execution thereof by the computer system 800, the main memory 804 and the processing device 802 also constituting machine-readable storage media. The contextual similarity measurement system 826 may further be transmitted or received over a network 818 via the network interface device 822.

The computer-readable storage medium 824 may also be used to store the contextual similarity measurement system 826 persistently. While the computer-readable storage medium 826 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly he taken to include, but not be limited to, solid-state memories, and optical and magnetic media.

The modules 828, components and other features described herein (for example in relation to FIG. 1) can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing term such as "computing," "preprocessing," "scoring," "measuring," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for measuring the contextual similarity of documents been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A computer-implemented method comprising:
    creating, by a similarity model generator of a computing device, a similarity model of a reference document stored in a database in a storage device, the similarity model of the reference document based on an adaptive entropy coding compressor;
    computing, by a similarity comparator of the computing device for each of the reference document and a compared document, a number of compression bits needed to compress each of the reference document and the compared document using the similarity model of the reference document;
    normalizing each of the computed number of compression bits for the reference document and the compared document, wherein the normalizing comprising dividing the computed number of compression bits by a number of tokens in the document being normalized;
    assigning each of the normalized computed number of compression bits as a similarity score for the respective reference document and the compared document; and
    computing, by the similarity comparator, a similarity measure between the compared document and the reference document, the similarity measure being a function of each of the similarity scores of the compared document and the reference document.

2. The computer-implemented method of claim 1, wherein the similarity measure is single valued.

3. The computer-implemented method of claim 1, wherein the adaptive entropy coding compressor uses a prediction by partial match model to make predictions.

4. The computer-implemented method of claim 3, wherein the prediction by partial match model is based on using tokens of the reference document.

5. The computer-implemented method of claim 4, wherein a token is a word.

6. The computer-implemented method of claim 1, further comprising:
    preprocessing the compared document and the reference document to enhance the statistical features of the these documents.

7. A non-transitory computer readable storage medium having instructions stored thereon that, when executed by a processing system, cause the processing system to perform a method comprising:
    creating, by a similarity model generator of a computing device, a similarity model of a reference document stored in a database in a storage device, the similarity model of the reference document based on an adaptive entropy coding compressor;
    computing, by a similarity comparator of the computing device for each of the reference document and a compared document, a number of compression bit needed to compress each of the reference document and the compared document using the similarity model of the reference document;
    normalizing each of the computed number of compression bits for the reference document and the compared document, wherein the normalizing comprising dividing the computed number of compression bits by a number of tokens in the document being normalized;

assigning each of the normalized computed number of compression bits as a similarity score for the respective reference document and the compared document; and computing, by the similarity comparator, a similarity measure between the compared document and the reference document, the similarity measure being a function of each of the similarity scores of the compared document and the reference document.

8. The non-transitory computer readable storage medium of claim 7, wherein the similarity measure is single valued.

9. The non-transitory computer readable storage medium of claim 7, wherein the adaptive entropy coding compressor uses a prediction by partial match model to make predictions.

10. The non-transitory computer readable storage medium of claim 9, wherein the prediction by partial match model is based on using tokens of the reference document.

11. The non-transitory computer readable storage medium of claim 10, wherein a token is a word.

12. The non-transitory computer readable storage medium of claim 7, wherein the method further comprises:

preprocessing the compared and reference documents to enhance the statistical features of the compared and reference documents.

13. A contextual similarity measurement system comprising:

a storage device to store a database;

a processing device communicably coupled to the storage device;

a similarity model generator executed by the processing device, the similarity model generator configured to create a similarity model of a reference document stored in a database in the database, the similarity model of the reference document based on an adaptive entropy coding compressor; and a similarity comparator executed by the processing device, the similarity comparator configured to:

compute, for each of the reference document and a compared document, a number of compression bit needed to compress each of the reference document and the compared document using the similarity model of the reference document;

normalize each of the computed number of compression bits for the reference document and the compared document, wherein normalizing each of the computer number of compression bits comprising dividing the computed number of compression bits by a number of tokens in the document being normalized;

assign each of the normalized computed number of compression bits as a similarity score for the respective reference document and the compared document; and compute a similarity measure between the compared document and the reference document, the similarity measure being a function of each of the similarity scores of the compared document and the reference document.

14. The contextual similarity measurement system of claim 13, wherein the similarity measure is single valued.

15. The contextual similarity measurement system of claim 13, wherein the adaptive entropy coding compressor uses a prediction by partial match model to make predictions.

16. The contextual similarity measurement system of claim 15, wherein the prediction by partial match model is based on using tokens of the reference document.

17. The contextual similarity measurement system of claim 13, wherein the similarity comparator includes:

a similarity score module to compute a similarity score for each of the compared document and the reference document.

18. The contextual similarity measurement system of claim 13, further comprising:

a preprocessor to preprocess the compared document and the reference document to enhance the statistical features of the compared document and the reference document.

* * * * *